Sept. 8, 1959  L. KADLEC  2,902,970
ILLUMINATED DIAL POINTER
Filed Oct. 9, 1957
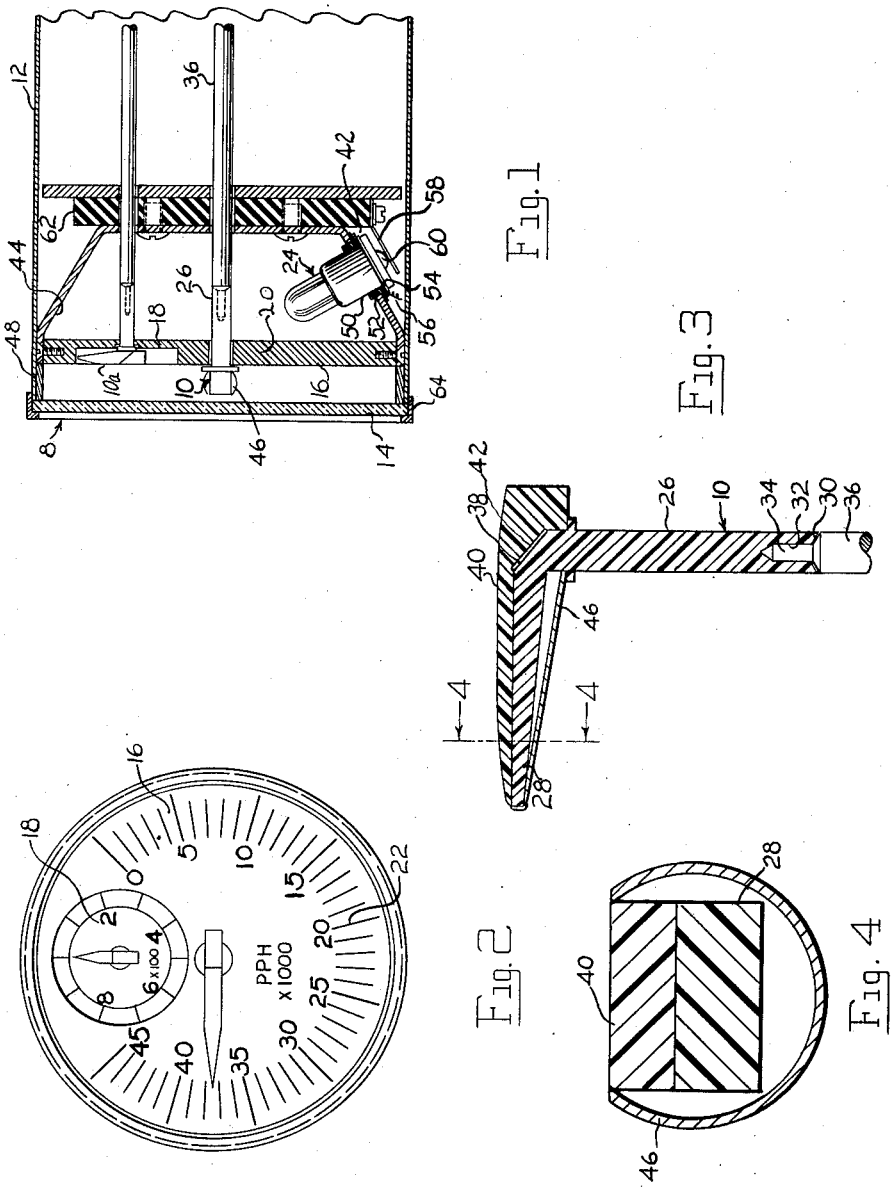
INVENTOR.
LADISLAV KADLEC
BY
Leonard H. King United States Patent Office 2,902,970
Patented Sept. 8, 1959

2,902,970
ILLUMINATED DIAL POINTER

Ladislav Kadlec, New York, N.Y., assignor to Avien, Inc., Woodside, N.Y.

Application October 9, 1957, Serial No. 689,176

8 Claims. (Cl. 116—129)

The present invention relates to an improved dial pointer utilizing indirect lighting means to illuminate the said pointer.

Pointers of this type are especially adapted to be used with aircraft instruments for night flight conditions, wherein the dial pointer and the indicia upon the dial face are made visible, but no other source of light is permitted, so that the night vision of the pilot is preserved. To accomplish this, lighting placed to the rear of the dial face is used, this light source being enclosed and blocked off except for the extent necessary to illuminate the dial indicia and the dial pointer. However, for wider flexibility and utility for such an instrument it is necessary that the dial pointer be perfectly adequate for indicating purposes under daylight conditions, that is to say the indicating system should have good daylight contrast.

It is therefore a major object of the present invention to provide an improved dial pointer adapted to be used with aircraft instruments under night-flight conditions and also serve as an efficient dial pointer under daylight conditions.

It is another object of the present invention to provide for an improved illuminated instrument of compact construction consonant with a high order of efficiency.

Yet another object of the present invention is to furnish an illuminated dial pointer having a higher measure of visibility for a given light source than comparative dial pointers presently in use.

It is still another object of the present invention to provide for an illuminated dial pointer of longer longitudinal dimension for a given light source and given casing dimensions than comparative instruments presently in use, thus enabling the viewer to read the indicia upon the instrument with greater ease and rapidity.

Yet a further object of the present invention is to provide an indicator pointer of greater simplicity of construction, which may be readily assembled and dismantled.

Still a further object of the present invention is to provide light means for an instrument of this type having improved heat dissipation qualities and greater compactness.

These and other objects and advantages of the present invention will become apparent from the following drawings and the description.

In the drawings:

Figure 1 is a view in vertical cross-section of a device of the present invention.

Figure 2 is an end view of a device of the present invention.

Figure 3 shows in a vertical section the dial pointer employed in a device of the present invention.

Figure 4 is an enlarged cross-sectional view taken along line 44 of Figure 3.

Referring now to the drawings, the device, characterized generally by the numeral 8, in the present embodiment comprises an instrument adapted for installation on aircraft. However, it will be understood that other applications and installations may be made as well. To further illustrate the compactness and efficiency attainable under the present device, the embodiment illustrated employs a main dial section with associated main-dial shaft, and a sub-dial, with associated sub-dial shaft, though a greater number of components mounted within the same casing could be used if desired, or else, of course, the conventional signal dial and single shaft could be used.

Said device 8 comprises a casing 12, with dial window 14, at one end thereof, through which the viewer can observe main dial face 16 and sub-dial face 18 formed integrally with the main dial face (Figure 2).

Said dial face is formed of a clear plastic material such as acrylic resin 20, upon which is coated with a translucent layer of white paint covered by an opaque layer of black paint. The black paint is removed at desired portions by photographic or mechanical means to thereby expose portions of the translucent white layer which define indicia 22 upon the dial face. In some applications the degree of opacity of the black layer is controlled so as to provide faint illumination of the dial face. This avoids the optical illusion of floating dial markings.

Indicia 22 is made visible under night-flight conditions by means of light source 24, disposed to the rear of said dial face, the rest of the light being blocked by the opaque paint layer. The present invention contemplates the use of novel means to utilize said light source to illuminate dial pointer 10, in addition to its function of illuminating dial face 16, and sub-dial 18.

Dial pointer 10 is formed of molded glass or of clear, light-transmitting plastic such as acrylic resin, and comprises a shaft portion 26 and a sweep portion 28 integral therewith. Shaft 26 terminates in base portion 30, in which an axial bore 32 is formed.

A section 34 of condition-responsive shaft 36 is securely fitted into axial bore 32, whereby shaft 26 is rotatable with shaft 36. It should be noted that the two shaft portions are thus easily assembled, as by a simple force fit, and similarly may be readily dismantled for inspection and repair.

As shown in Figures 1 and 3, base portion 30 is beveled inwardly to form an acute angle with shaft 36. Base portion 30 thus effectively defines a light-reflective surface frusto-conical in shape, with reference to light source 24 positioned proximate thereto.

At the junction between shaft 26 and sweep portion 28 there is formed a light-reflecting surface 38, made by beveling the outer elbow section of the said juncture. The inside face of beveled surfaces 30 and 38 will produce total reflection of incident light, where a suitable light refracting substance is employed. For polymethyl methacrylate, for example, a bevel angle ranging from about 42 degrees to 45 degrees should be used. For other resins the precise angle will depend on the refraction coefficient of the given material. Other light-reflective materials, such as molded glass, may also be used. Thus, by means of the two light-reflecting surfaces, 30 and 38, sweep portion 28 receives reflected light from light source 24 and is illuminated. It should be noted that lower sweep portion 28 is tapered longitudinally in vertical cross-section. The angle of taper serves to define an additional light-reflecting surface whereby light from surface 38 is diffused and reflected upward into the body portion of the sweep portion, throughout the length thereof.

While the illuminated dial pointer as described above is highly effective for night-flight conditions, it is recognized that the level of illumination thus furnished would be inadequate for use with the instrument in daylight.

To increase the visibility of the dial pointer for daytime use, the present invention incorporates an additional pointer segment 40, which is fitted dorsally and longitudinally to sweep portion 28, as shown in the drawing, Figure 3.

Segment 40 is formed of milky-white translucent plastic, such as a pigmented acrylic resin, thus providing good daylight contrast. Segment 40 makes a close fit the sweep portion 28, therefore, under night-flight conditions the illuminated sweep portion is visible to the viewer, while in daylight the upper portion, segment 40, provides the requisite visibility. If glass is used as the material for the sweep portion then a milky glass may be used for segment 40.

Segment 40 receives reflected light in uneven amounts from dial pointer 10. That is, there will be a bright spot formed on segment 40 proximate to the region near reflecting surface 38, and a progressively dimming effect towards the terminal portion of segment 40. To compensate for this, and to insure an even diffusion of light throughout this segment, the present invention provides that this upper segment serve as a graduated mask serving to greatly reduce the light intensity in regions of maximum illumination, and conversely, that the terminal portion of this segment be tapered to form a thin vertical cross-sectional area, thus permitting the transmission of a maximum amount of reflected light from the dial pointer underneath.

The type of fit between segment 40 and sweep portion 28 will have a marked effect on the brightness of segment 40, and correspondingly on the brightness near the point. For example, an optically perfect joint will result in maximum light transmission to segment 40 close to the shaft and thereby reduce the available light for ultimate illumination of the point portion. Therefore a simple close mechanical fit between the members is preferred.

In order to minimize the common contact area of the mating surfaces, it is preferred that the upper surface of the lower sweep portion be sufficiently smooth to appear polished upon visual examination, while the mating lower surface is preferably left with a matt finish. Thereby contact between the surfaces is limited to engagement of the high points of the matt surface with the polished face.

The uniformity of the brightness of segment 40 may also be controlled by using a graduated fit ranging from, for example, an optical fit at the tip, to the air space at surface 38.

The pointer assembly comprising pointer 10 and segment 40 is provided with a sheath of aluminum foil 46 disposed along the length of this pointer assembly and enclosing the sides and bottom portions, leaving only the top portion of the pointer visible to the viewer under night flight conditions. By using this aluminum foil to mask the side portions, a sharper optical contrast is provided for the viewer, and there is a further decrease of light being emitted from the instrument, which would otherwise distract the viewer in condition of night-flight. Thus only the amount of light actually needed for viewing the dial is emitted, with all unnecessary light being blocked off, and the dial pointer presents a flat, two-dimensional effect. The said aluminum foil is cemented to the dial pointer, but no optical contact is made, the aluminum acting only as a reflective surface, and thus aids uniformity of illumination, since it reflects light back into the dial along the length thereof.

It should be noted that in joining segment 40 to sweep portion 28, the effectiveness of reflecting surface 38 is preserved by means of air space 42 between surface 38 and segment 40. Therefore light reflection down the length of the pointer is not interfered with. It should also be noted that segment 40 extends to an appreciable degree to the rear of sweep portion 28, thus increasing the overall length of dial pointer visible to the observer. This extension is commonly known as a "tail."

To insure increased compactness and efficiency, the present invention provides for improved light means. Light source 24 comprises lamp holding assembly 43 mounted in mirrored shell 44. Shell 44 helps reflect light to shaft 26, and also acts as a heat dissipator, being connected to the casing at 48. As is well known the output of a lamp is only partially in the visible spectrum. The heat is absorbed by mirrored shell 44 and conveyed to the outer casing at 48 which in turn provides a large exposed radiating area.

One feature of the present embodiment is the employment of angularly positioned bulbs, which provides for a compact assembly.

As shown in Figure 1, an auxiliary dial pointer assembly 10a may be disposed within the instrument, similar in construction and function to the dial assembly hereinbefore described. Thus the given light source 24 can serve to illuminate a plurality of dial pointers, where the specific type of instrument requires this type of indication.

As shown in Figure 1, metal shell 50 of bulb 24 is secured by insulating sleeve 52. Electrically conductive ring 54 which is contacted by conductor 56, makes contact to a terminal portion 50 of lamp 24.

The terminal pin 60 of lamp 24 is contacted by spring member 58. Conventional conductors from a power source complete the circuit to member 58. Member 58 is supported by insulating plastic base 62. The lamp assembly and the dial pointer assembly is enclosed by casing 12, which is rigidly joined to dial window 14 by bezel 64.

The reflector 46 may be formed of a metallized plastic film or other reflecting material and need not be of aluminum foil as is currently preferred. In some instances, reflector 46 may be omitted without detracting from the other advantages of this invention.

Having thus disclosed a specific embodiment of the invention, I wish it understood that various changes may be made without departing from the spirit of the invention.

What is claimed is:

1. An illuminated instrument comprising a casing, a dial window at one end thereof, an indicia-bearing dial face disposed within said casing visible through said dial window, the said dial face being provided with a central opening, a dial pointer comprising a rotatable first shaft portion, a first sweep portion integral with and rotatable by said first shaft portion, a second sweep portion rigidly secured in a close fit dorsally to and substantially coextensive with said first sweep portion, the said shaft and said first sweep portion being formed of clear light-transmitting material, the said second sweep portion being formed of a visibly exposed translucent daylight-visible material, the said dial pointer disposed with the said first shaft portion passing through said central opening in said dial face and the said sweep portions being movable between said dial window and said dial face to register with indicia on said dial face, a first angular offset portion formed at the junction of said first sweep portion and said shaft portion to define a light-reflecting surface, a condition-responsive second shaft portion rigidly secured to and axially continuous with said first shaft portion and serving to rotate said first shaft portion, a second angular offset portion formed on said first shaft portion at the point of junction with said second shaft portion to define a second light-reflective surface, a source of light disposed within said casing to the rear of said dial face and proximate to said first shaft portion, whereby said light source illuminates said first shaft portion and is reflected and diffused therethrough by means of said second light-reflective surface, and is further reflected and diffused by means of said first light-reflective surface to illuminate said first dial sweep portion and thence said second dial sweep portion.

2. A device as in claim 1, wherein the said light source includes a light bulb and a mount, therefore the said mount having a portion thereof joined integrally to the said casing in heat-dissipating relation, the said mount being disposed at an acute angle in reference to said casing, whereby the said light bulb in said mount is oriented angularly towards the said first shaft portion and towards the bottom surface of said dial face.

3. A device as in claim 1 wherein a light-reflective sheath is attached to said sweep portions in spaced relationship thereto so as to enclose the sides of said sweep portions and the bottom of said first sweep portion.

4. A dial pointer assembly adapted for indirectly lighted instruments comprising a rotatable shaft portion, a first sweep portion integral with and rotatable by said shaft portion, a second sweep portion rigidly secured, in a close fit, dorsally to and substantially coextensive with said first sweep portion, the said shaft and said first sweep portion being formed of clear light-transmitting material, and the said second sweep portion being formed of a visibly exposed translucent daylight-visible material.

5. A device as in claim 4, wherein said second sweep portion extends to an appreciable distance to the rear of said first sweep portion to define a tail section.

6. A dial pointer as in claim 4, wherein an angular offset portion is provided at the junction of said shaft portion and said first sweep portion to define a light reflective surface, and an air space is disposed between the first light-reflective surface and said second sweep portion.

7. A dial pointer as in claim 4, wherein a light-reflective metallic coated sheath is formed on said sweep portions, enclosing the sides of said sweep portions and the bottom of said first sweep portion.

8. An indirectly illuminated pointer assembly comprising: a source of light; an elongated pointer of light conductive material; a shaft of light conductive material attached to said pointer, said shaft being positioned to receive light from said source and transmit light to said pointer, said pointer having an elongated normally viewed flat upper surface, defined by a pair of elongated edges, and contiguous side and bottom portions; and an elongated light reflecting member, defined by a pair of elongated edges, surrounding said side and bottom portions in spaced relationship with each of said upper surface elongated edges in juxtaposition with a different one of said light reflecting member elongated edges whereby said upper surface and said light reflective member provide a continuous surface surrounding said pointer.

References Cited in the file of this patent
UNITED STATES PATENTS

| | | |
|---|---|---|
| 2,278,520 | Klein | Apr. 7, 1942 |
| 2,280,700 | Hall | Apr. 21, 1942 |
| 2,287,605 | Dickerson | June 23, 1942 |